United States Patent Office 3,485,028
Patented Dec. 23, 1969

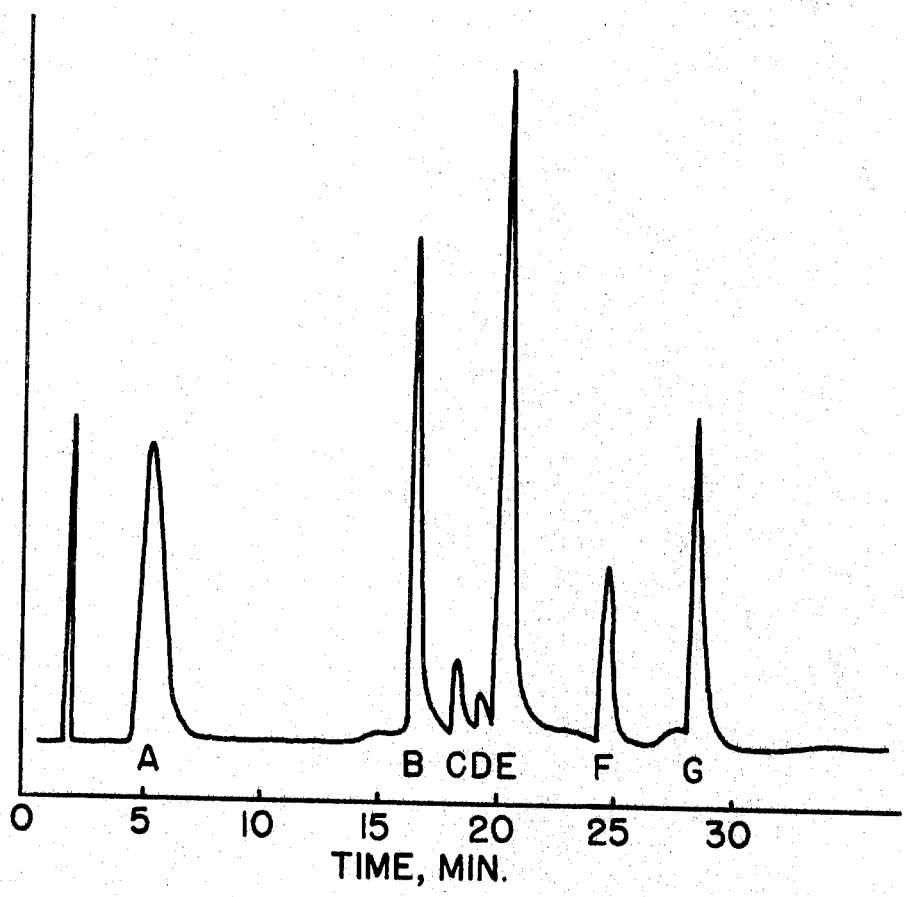

3,485,028
THERMALLY STABLE STATIONARY PHASES FOR TEMPERATURE PROGRAMMED GAS CHROMATOGRAPHY
Verle L. Davison, East Peoria, Everett H. Pryde, Peoria, and Danny J. Moore, Wheeling, Ill., assignors to the United States of America as represented by the Secretary of Agriculture
Filed Dec. 20, 1968, Ser. No. 785,594
Int. Cl. B01d 15/08
U.S. Cl. 55—386    1 Claim

ABSTRACT OF THE DISCLOSURE

Improved temperature-programmed gas chromatographic resolutions of mixtures composed of different classes of constituents are obtained even with only one column where the diatomaceous support of the column has been calcined without flux and then has been coated with certain polyester acetals or polyamide acetals that have then been thermally crosslinked in situ and interbonded thereto.

FIELD OF THE INVENTION

This invention pertains to the discovery that greatly improved temperature-programmed gas chromatographic analyses of multicomponent mixtures are obtained by the use of even only a single column when the diatomaceous support, critically calcined without flux, has been coated with certain prior art poly(ester-acetals) or poly(amide-acetals) that have then been thermally crosslinked and interbonded thereto under acidic conditions.

More particularly, this invention relates to the discovery that highly effective temperature-programmed gas chromatographic analyses and resolutions of diverse constituent mixtures are obtained with even only a single column when the column comprises a conventional diatomaceous earth support that has been calcined in the absence of flux and then the so-calcined support has then been coated with a prior art linear poly(ester-acetal) (PEA) produced by interreacting 3,9-bis(7-carbomethoxyheptyl) - 2,4,8,10 - tetraoxaspiro(5,5)undecane with a dicarboxyl compound such as, preferably, dimethyl terephthalate, or succinic acid or adipic acid, and a glycol such as ethylene glycol or diethylene glycol, or the poly(amide-acetal) (PAA) produced by interreacting 3,9-bis(7-carbomethoxyheptyl)-2,4,8,10-tetraoxaspiro(5,5)undecane, dimethyl azelate, and hexamethylene diamine, and then thermally crosslinking the linear polymer coating under acidic conditions, whereby the resulting crosslinked stationary phases are highly resistant to bleeding even at temperatures above 250° C. that volatize the conventional stationary phase materials, and whereby the improved bleeding resistant stationary phase crosslinked polymers of the invention also exhibit an unexpectedly broadened spectrum of sharply graded thermally releasable affinities for hydrocarbons, esters, and aldehydes, whereby a mixture of all three types can be analyzed or resolved with only one column.

DESCRIPTION OF THE PRIOR ART

Temperature-programmed gas chromatography of multicomponent mixtures is a widely employed analytical procedure, but it is handicapped by the relatively low thermal stabilities, excessive bleeding at higher temperatures, and severely selective polarity or nonpolarity of the presently employed stationary phases. Although many resolutions can be effected by mixing stationary phases having different polarities, the baseline stability is then limited and disadvantageously controlled by the stationary phase component having the lowest degree of thermal stability.

Gas chromatographic resolutions of hydrocarbons using crosslinked polyaromatic columns has been reported by Hollis, Anal. Chem. 38:308 (1966), but these polyaromatics do not exhibit greater thermal stabilities than such widely used polar liquids as diethylene glycol succinate that is specific for resolving esters and aldehydes, or than methyl silicone fluid, which is specific for hydrocarbons.

SUMMARY OF THE INVENTION

Mixtures of methyl esters, ketones, and aldehydes can be accurately analyzed and resolved by temperature-programmed gas chromatography of such mixtures on a single column comprising a flux-free calcined diatomaceous earth support that has been coated with certain linear poly(ester-acetal) or poly(amide-acetal) derviatives of 3,9 - bis(7 - carbomethoxyheptyl)-2,4,8,10-tetraoxaspiro(5,5)undecane and then has been chemically bonded at reactive silanol sites, mainly through reformed acetal bonds, with the glassy, infusible, catalytically and thermally crosslinked PEA optimally comprising 80 percent by weight of dimethyl terephthalate or with PAA comprising preferably 65 percent by weight of dimethyl azelate.

The herein described invention will be seen to satisfy the following and other objects thereof.

One object is the provision of crosslinked stationary phases for gas chromatographic columns that are nonvolatile, nonbleeding, and stable to temperatures as high as about 400° C.

Another object is the provision of semipolar stationary phases that exhibit essentially no bleeding whatever at temperatures below those at which the polymers degrade.

Another object is the provision of superior packings for gas chromatographic columns that enable a single column to provide resolutions that heretofore required multiple columns.

EXAMPLE 1

A linear poly(ester-acetal) (PEA) comprising 80 percent by weight of dimethyl terephthalate and made precisely in accordance with Example 2 of Pryde, U.S. Patent 3,183,215, was dissolved in benzene and the solution was used to thoroughly wet a conventionally calcined (without flux) diatomaceous earth silica support sold by the Johns Mansville Company under the proprietary name "45–60 Chromasorb-W." Following the addition of 0.1 percent by weight of p-toluene sulfonic acid catalyst and removal of the benzene solvent on a rotary evaporator, the diatomaceous support material now coated with 20 percent of its weight of the linear PEA, was used to prepare duplicate columns in 0.435 cm. coiled aluminum tubing, which columns were then ovened at 260° C. for 12 hours with no gas flow followed by 4 hours at 350° C. in the presence of a 150-ml./minute flow of nitrogen. The thusly tempered columns containing the now crosslinked PEA stationary phase were employed as the analytical columns in a temperature-programmed Wilkens Aerograph, Model 350–B chromatograph equipped with a standard filament cell.

Analyses giving the relative retention times and corresponding temperatures for the compounds set forth in Table 1 obtained on our improved column and for comparison purposes also obtained on columns whereof the "Chromasorb" support had been treated with hexamethyl disilazane and then coated with diethylene glycol succinate or with methyl silicone fluid (General Electric "SF–96") and finally conditioned for 4 hours at 200° C. without nitrogen flow, followed by another 4 hours at 250° C. with 150 ml./minute nitrogen, were conducted at a programmed rate of 6° C./minute from 25°–270° C.

for the methyl silicone and crosslinked PEA columns, and from 25°–240° C. for the DEGS columns. With the above programming any two peaks differing by 6° C. will separate but the DEGS column does not resolve a mixture of diethyl glutarate and dodecanal nor one of nonanol, Me adipaldehydate, and methyl laurate whereas the Me silicone column fails to resolve the nonanal, octanol, and diethyl glutarate components of a mixture.

TABLE 1.—RELATIVE RETENTION TIMES FOR VARIOUS STANDARDS
[Temperature programmed from 25° C.]

| Component | DEGS Times | ° C. | SF-96 Me silicone times | ° C. | PEA[1] times | ° C. |
|---|---|---|---|---|---|---|
| Methyl azelaaldehydate | 1.00 | 210 | 1.00 | 210 | 1.00 | 210 |
| 2-pentanone | 0.21 | 44 | 0.32 | 67 | 0.26 | 55 |
| 2-octanone | 0.47 | 99 | 0.64 | 134 | 0.56 | 118 |
| Nonanal | 0.53 | 111 | 0.73 | 153 | 0.52 | 109 |
| 1-octanol | 0.61 | 128 | 0.72 | 151 | 0.70 | 147 |
| Diethyl glutarate | 0.70 | 147 | 0.72 | 151 | 0.92 | 193 |
| Dodecanal | 0.72 | 151 | 1.00 | 210 | 0.87 | 163 |
| 1-nonanol | 0.80 | 168 | 0.86 | 181 | 0.92 | 193 |
| Methyl adipaldehydate | 0.82 | 172 | 0.75 | 158 | 0.80 | 168 |
| Methyl laurate | 0.83 | 174 | 1.11 | 233 | 1.06 | 223 |
| Methyl palmitate | 0.98 | 206 | 1.35 | 284 | 1.16 | 244 |
| Dimethyl sebacate | 1.11 | 233 | 1.19 | 250 | 1.14 | 239 |

[1] PEA=Poly(ester-acetal) 80 percent dimethyl terphthalate.

The figure represents a chromatogram programmed at 5.5° C./minute from 25°–250° C. using the above described column with the same crosslinked PEA stationary phase packing. The peaks, labeled A–G, respectively, represent 2-pentanone (A); 1-octanol (B); dimethyl glutarate (C); undecanal (D); diethyl glutarate (E); methyl azelaaldehydate (F); and methyl palmitate (G).

EXAMPLE 2

Example 1 was repeated with the exception that the diatomaceous support was coated and then crosslinked with a linear poly(amide-acetal) reaction product of 3,9-bis(7 - carbomethoxyheptyl) - 2,4,8,10-tetraoxaspiro(5,5) undecane, hexamethylene diamine, and dimethyl azelate (the latter constituting 65 percent of the polymer weight), made precisely in accordance with Example 5 of U.S. Patent 3,223,683. The linear polymer was deposited from a formic acid solution since it was only partially soluble in benzene, and then crosslinked and conditioned in situ exactly as was the PEA column of Example 1. The results with the thermally crosslinked PAA stationary phase were essentially identical with those obtained with the poly (ester-acetal) column of Example 1.

We claim:
1. In a tempered column for temperature-programmed gas chromatography comprising a diatomaceous earth support that has been calcined in the complete absence of flux and having thereon a chromatographic stationary phase coating, the improvement comprising employing as said coating in an amount corresponding to about 20 percent of the said support weight of a subsequently in situ crosslinked poly(ester-acetal) from the interreaction of 3,9 - bis(7 - carbomethoxyheptyl) - 2,4,8,10-tetraoxaspiro (5,5) undecane, dimethyl terephthalate, and ethylene glycol, wherein the dimethyl terephthalate component constitutes about 80 percent of the polymer weight.

References Cited

UNITED STATES PATENTS 3,392,507    7/1968    Ottenstein _____ 55—67

JAMES L. DeCESARE, Primary Examiner